(12) United States Patent
Conley

(10) Patent No.: US 9,055,287 B2
(45) Date of Patent: Jun. 9, 2015

(54) LENS STRUCTURE AND METHOD OF PRODUCING AND DISPLAYING A THREE DIMENSIONAL IMAGE

(76) Inventor: Kenneth E. Conley, Matthews, NC (US)

( * ) Notice: Subject to any disclaimer, the term of this patent is extended or adjusted under 35 U.S.C. 154(b) by 37 days.

(21) Appl. No.: 12/871,307

(22) Filed: Aug. 30, 2010

(65) Prior Publication Data

US 2010/0321776 A1 Dec. 23, 2010

Related U.S. Application Data

(60) Continuation-in-part of application No. 12/364,614, filed on Feb. 3, 2009, now Pat. No. 7,808,711, which is a division of application No. 11/512,451, filed on Aug. 30, 2006, now Pat. No. 7,660,041.

(51) Int. Cl.
*G02B 27/10* (2006.01)
*H04N 13/04* (2006.01)
*G02B 27/22* (2006.01)

(52) U.S. Cl.
CPC ........ *H04N 13/0404* (2013.01); *G02B 27/2214* (2013.01); *H04N 2213/001* (2013.01)

(58) Field of Classification Search
USPC ......... 359/618–626, 463, 462, 242, 244, 267, 359/277, 811, 813, 815, 819, 822–824
See application file for complete search history.

(56) References Cited

U.S. PATENT DOCUMENTS

| 5,640,273 | A | 6/1997 | Hamagishi et al. | |
|---|---|---|---|---|
| 6,084,978 | A | 7/2000 | Taylor et al. | |
| 6,396,472 | B1 | 5/2002 | Jacklin | |
| 6,713,785 | B2 * | 3/2004 | Yagi | 257/59 |
| 6,760,021 | B1 * | 7/2004 | Karszes et al. | 345/419 |
| 6,995,914 | B1 | 2/2006 | Conley et al. | |
| 7,154,642 | B2 | 12/2006 | Lichtfuss | |
| 7,660,041 | B1 | 2/2010 | Conley | |
| 2001/0050813 | A1 * | 12/2001 | Allio | 359/462 |
| 2002/0131022 | A1 * | 9/2002 | Shibatani et al. | 353/31 |
| 2003/0053009 | A1 * | 3/2003 | Sato et al. | 349/95 |
| 2004/0165265 | A1 * | 8/2004 | Harris | 359/464 |

(Continued)

FOREIGN PATENT DOCUMENTS

JP 4-366926 * 6/1991 .............. G02F 1/17

OTHER PUBLICATIONS

Van Berkel, CEES, Image Preparation for 3D-LCD, Part of the IS&T/SPIE Conference on Stereoscopic Displays and Applications X, San Jose, California, Jan. 1999, SPIE vol. 3639, pp. 84-91.

*Primary Examiner* — Stephone B Allen
*Assistant Examiner* — Brandi Thomas
(74) *Attorney, Agent, or Firm* — Ashley Law Firm P.C.; Stephen S. Ashley, Jr.

(57) ABSTRACT

A lens structure is disclosed and the associated method of manufacturing the same having as its primary steps the provision of a substantially transparent substrate material; forming a plurality of lenses on a first side of the substrate; and shaping the substrate to correspond to a display area of a display device, wherein the plurality of lenses are angled to correspond to the pixel size and pitch of the display area. A display system is also disclosed, wherein the display systems generally includes a data source for processing, saving and playing at least one image; software for interlacing the image; software for processing slides and movies comprised of multiple images; a lenticular screen overlaid upon a video display device for viewing the interlaced images in three dimensions.

20 Claims, 4 Drawing Sheets

(56) References Cited

U.S. PATENT DOCUMENTS

| | | | |
|---|---|---|---|
| 2005/0030646 A1* | 2/2005 | Braun | 359/796 |
| 2005/0195276 A1 | 9/2005 | Lipton et al. | |
| 2005/0225687 A1* | 10/2005 | Yamauchi | 349/5 |
| 2006/0023197 A1 | 2/2006 | Joel | |
| 2006/0038879 A1* | 2/2006 | Kremen | 348/51 |
| 2007/0201133 A1 | 8/2007 | Cossairt | |
| 2008/0218855 A1 | 9/2008 | Van Berkel | |
| 2008/0273242 A1 | 11/2008 | Woodgate et al. | |
| 2009/0116108 A1 | 5/2009 | Levecq et al. | |
| 2009/0213210 A1 | 8/2009 | Conley | |

* cited by examiner

LENS STRUCTURE AND METHOD OF PRODUCING AND DISPLAYING A THREE DIMENSIONAL IMAGE

CROSS-REFERENCE TO RELATED APPLICATION(S)

This application is a continuation-in-part application of U.S. patent application Ser. No. 12/364,614, filed Feb. 3, 2009, issued as U.S. Pat. No. 7,808,711, and entitled "METHOD OF PRODUCING AND DISPLAYING A THREE DIMENSIONAL IMAGE", which is a divisional application of U.S. patent application Ser. No. 11/512,451, filed Aug. 30, 2006, issued as U.S. Pat. No. 7,660,041, and entitled "METHOD OF PRODUCING A SHEET HAVING LENTICULAR LENSES FOR A THREE DIMENSIONAL DISPLAY SYSTEM," the contents of which are incorporated in full by reference herein.

BACKGROUND OF THE INVENTION

1. Field of the Invention

The present invention relates generally to a lens structure and the associated method for manufacturing the lens structure, and more particularly, to a lens structure and the associated manufacturing method operable for use with a three dimensional display system for displaying video images.

2. Technical Background

Various methods and apparatus for forming a three dimensional image when viewed are known in the art, particularly as it relates to three dimensional video or television viewing. As is understood by those skilled in the art, the term "three dimensional," is an image of an object, or arrangement of objects, to have an appearance of height, width and depth. This contrasts with conventional photographs, videos and unmodified digital format conversions of the same, which display the dimensions of height and width but, for reasons including lack of parallax, do not display a true image of depth. Such images are known as two dimensional images.

There are at least two known methods for recording, arranging and reformatting two-dimensional photographic images, or pluralities thereof (i.e, video content), onto a flat medium or display screen, such as a television, that when viewed create an impression of depth. One is commonly known as the "3-D glasses" method. In its simplest form, a scene is photographed with two cameras, one corresponding to a person's left eye and one corresponding to a person's right eye. The developed pictures, or sequence of pictures for a movie, taken by the two cameras are then projected, one image atop the other, onto a flat screen through two respective projector lenses. The projector lenses apply a different color or polarization to the left and right image, with respect to one another, before overlaying them on the viewing screen. The viewer then wears special glasses that filter, by color or polarization, the overlaid images such that his or her left eye sees only the image from the "left eye" camera, while his or her right eye sees only the image from the "right eye" camera. Because of the parallax between the image seen by the left eye and right eye, the viewer senses an apparent depth, i.e., three dimensions.

There are, however, problems with the "3-D glasses" method. One problem is that the viewer must wear the special glasses. Another is that many viewers become nauseated due to visual distortions when viewing the picture.

A second known method for recording and transforming a two dimensional image, photograph or video onto a different medium which displays it to have apparent depth is the lenticular lens method. The optical principles of lenticular screen imaging are well known to one of ordinary skill in the relevant art. The lenticular lens method typically interlaces different images or viewing angles of a single image, using a raster type interlacing, and then places a sheet formed of a plurality of elongated strip lenses, or lenticules, over the raster image. The overlay is such that each lenticule or lens overlays raster lines. The lenticules are formed such that one image is presented to the viewer's left eye and another image is presented to the viewer's right eye. The difference between the left image and the right image approximates the parallax that the viewer would have experienced if viewing the original image in person.

Increasingly, it has become desirable to produce a three dimensional images or videos on a display device such as a computer monitor or a television screen. This increase in desirability is premised upon the desire to view television programs, games, movies or other video content in three dimensions (commonly referred to as "3D TV"). Various methods and systems are known in the art which overlay a lenticular lens on the computer montior or television screen such that a two dimensional image being displayed on the device will appear to have a three dimensional effect. Unfortunately, the known methods systems suffer several shortcomings. By way of example, known methods and systems have heretofore not provided an adequate manner of interlacing the images to accommodate for the pixel size and pitch of the specific montior or screen upon which it is being projected. By way of another example, known methods and systems do not disclose a manner of producing a lenticular lens which produces a high clarity three dimensional image at the viewing screen or monitor. Accordingly, there is a need in the art for a method of manufacture for a lenticular sheet such that the sheet, when produced, corresponds to the pixel size and pitch of the display device which the sheet is attached to. For such methods, is would be desirable to provide an improved three dimensional display system which includes a recording device, a computing device for interlacing recorded images, and a display device having a high clarity lenticular sheet removably, attached thereto.

SUMMARY OF THE INVENTION

To achieve the foregoing and other objects, and in accordance with the purposes of the invention as embodied and broadly described herein, the present invention provides various embodiments of a lens structure and the associated method for manufacturing, the same and being operable for removable attachment to a video display device of a three dimensional display system. To facilitate higher clarity in viewing the desired visual effects, the lenticular sheet of the present invention is preferably produced with a configuration that corresponds to the pixel size and pitch of the video display device. Further, to facilitate higher clarity in viewing the desired visual effects, the lenticular sheet is provided with a lower viewing angle than that provided by conventional methods and systems such that the resolution of an image displayed on the video display device is accommodated. In various embodiments, the method of the present invention produces a lenticular sheet having plurality of lenses located thereon and extending in an angled configuration, the lenticular sheet being operable for removable attachment to a video display device.

According to an exemplary embodiment, a method of manufacture for a lens structure or lenticular sheet and a three dimensional display system is provided wherein the lens structure or lenticular sheet is produced by the steps of obtaining predetermined values corresponding to the pixel size, resolution and pitch of a video display device. Based upon these predetermined values, an image which has been recorded and interlaced is resized to correspond to the video display device through the use of an interlacing and resizing software program of the type commonly available in the industry. Alternatively, an image is recorded and interlaced at a size corresponding to the display device. Once interlaced, the image is stored in a computing device.

Thereafter, a cutting tool is formed and used to engrave a predetermined lens pattern into a metal cylinder or plate at the desired area. The engraving of the cylinder or plate is performed in any known conventional manner of engraving. The lens pattern, as engraved into the cylinder, is then polished to achieve an optimal optical surface. Thereafter, the lens pattern is transferred to a desired side of a flexible, transparent plastic sheet at a desired location by using an extrusion nip when the sheet is formed or at an embossing nip with a preformed and heated plastic sheet, or by casting if made from an ultra violet light curing resin or with other curable resins. Subsequent to the embossing of the resulting lenticular sheet, the sheet is formed into a shape such that the size of the sheet corresponds to the dimensions of the video display device and so that lenticules of the sheet are angled to correspond to the pixel size and pitch values of the video display device.

The lenticular sheet is then cast or laminated to a stable biaxial oriented and heat stabilized film. Thereafter, the lenticular sheet is removably attached to the video display device such that the resized, interlaced two dimensional image may transmitted to the video display device from a data source such as a computing device and projected on the display device for viewing in three dimensions through the lenticular sheet.

The display system will generally be understood to include an input for receiving data from a data source, the data source being operable for processing, saving and playing at least one image; software for interlacing the image; software for processing slides and movies comprised of multiple images; a lenticular screen overlaid upon a video display device for viewing the interlaced images in three dimensions.

Additional features and advantages of the invention are set forth in the detailed description which follows and will be readily apparent to those skilled in the art from that description, or will be readily recognized by practicing the invention as described in the detailed description, including the claims, and the appended drawings. It is also to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be merely illustrative and not limiting the intended scope of the claims in any manner.

BRIEF DESCRIPTION OF THE DRAWINGS

The foregoing and other objects, aspects, and advantages will be better understood from the following description of exemplary embodiments of the invention with reference to the drawings, in which.

DETAILED DESCRIPTION

Figure 1:
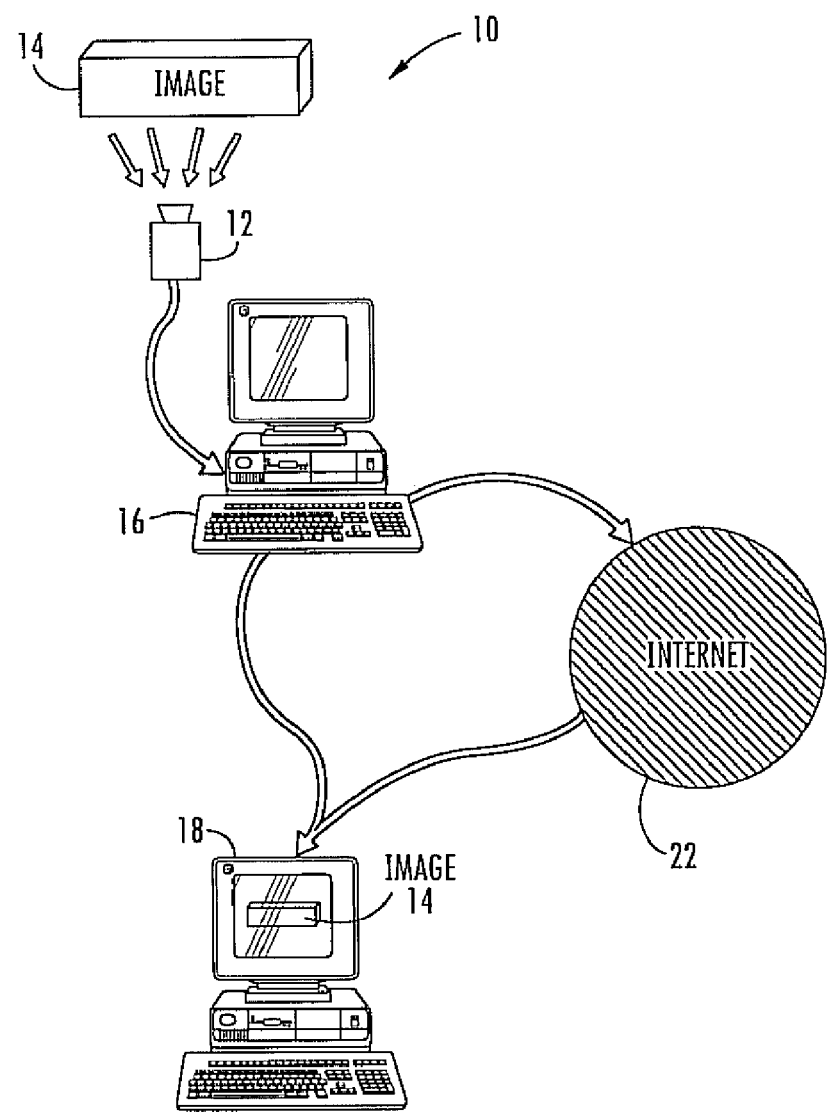
FIG. 1 is a diagrammatic view illustrating the various components of the lenticular system and method according to an exemplary embodiment of the present invention.

Reference will now be made in detail to exemplary embodiments of the invention, which are illustrated in the accompanying drawings. Whenever possible, the same reference numerals will be used throughout the drawings to refer to the same or like parts. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The various embodiments of the present invention may be applied in any known lenticular manufacturing system. As is well known and understood in the art, lenticular lens material utilizes rows of simple and commonly dome-shaped lenses or "lenticules" in combination with a line form or interlaced image, to create the desired visual effect. As used herein, the term "lenticular sheet" is intended to include any optical sheet, roll, film or material that is suitable for use in the printing arts and has a substantially transparent quality. Material compositions of such sheets may include, for example and without limitation, acrylic, polycarbonate, polyolefin, polypropylene, polyester, polyethylene, polyvinylchloride, polystyrene, and all such polymeric equivalent materials. All such compositions are considered to be polymeric sheet materials and are synonymous therewith. In one example, the lenticular sheet generally comprises a flat side and a lenticulated side including the lenticules.

The present invention, in one embodiment, provides a method of manufacture for a lenticular sheet and a lenticular system for displaying three dimensional images on a conventional video display device in sequence. Referring now to FIG. 1, a diagrammatic view of a lenticular system 10 according to an exemplary embodiment of the present invention is illustrated. As shown, the lenticular system 10 includes a recording device 12 operable for recording at least one image 14 and transmitting the image 14, a data source 16 having software operable for receiving, processing and interlacing a plurality of images 14 transmitted from the recording device such that the plurality of images 14 are interlaced, a display device 18 for displaying the interlaced images 14, and a lenticular sheet 20 connected to the display device 18 such that the interlaced plurality of images 14 may be viewed as a sequence of three dimensional images.

In exemplary embodiments described herein, the data source 16 may be any commercially available computing system or other recording system with adequate power and memory to handle the interlacing and imaging processes. Further, the software of the data source 16 is operable for processing predetermined information such as the type of image, the number of images, the display sequence of the images, and the pixel size and pitch and resolution of the display device. Still further, the software is operable for resizing the plurality of images 14 to correspond to the size of the display device 18 and the lenticular sheet 20 such that the quality of the viewed images is optimized. In exemplary embodiments, a display device 18 having a flat screen is used such that the lenticular sheet 20 may be easily attached to the surface thereof. By using the system of the present invention, the use of 3-D type glasses is obviated. Still further, by using the system of the present invention, a more efficient and higher clarity and brightness sequence of images is provided over conventional and known methods and systems.

In exemplary embodiments of the present invention, the image 14 is recorded and prepared by using conventional recording means including, for example, a digital camera device or the like having multiple lens thereon for recording numerous views of the image 14, such that the image 14 can be interlaced to provide the illusion of depth. In preferred embodiments, the image 14 is prepared by combining or interlacing selected images or video content on the data source 16 such that the images 14 are produced in a manner ready for printing and/or viewing. The interlacing of the images 14 is preferably performed by a software application readily available in the industry. By way of example, a common program is "Flip" available from Kutuz, Inc. Alternatively, software applications such as Photoshop™, Corel Draw™ and others may be utilized. The images 14 are interlaced at a combining frequency equal to that of the lenticular sheet 20, such as commonly done for lenticular assemblies using printed images in combination with lenticular sheets. Previously interlaced images made for printing and combining to a lenticular sheet may be used in the present invention by resizing the images to match the frequency or "pitch" of the lenticular sheet that has been placed over the display device. For recorded images which have not been previously interlaced, they are interlaced such that the resulting product corresponds to the pixel pitch and size of a video display device 18. Once interlaced, the images 14 are stored in the data source 16 and/or transmitted from the data source 16 to the display device 18 through an input (not shown). In other exemplary embodiments, the images 14 will be transmitted through the Internet 22. If the images 14 are transmitted through the Internet 22, they will later be resized to correspond to the display device 18. In still other exemplary embodiments, the images are transmitted via a cable wire or via a satellite transmission.

Figure 2:
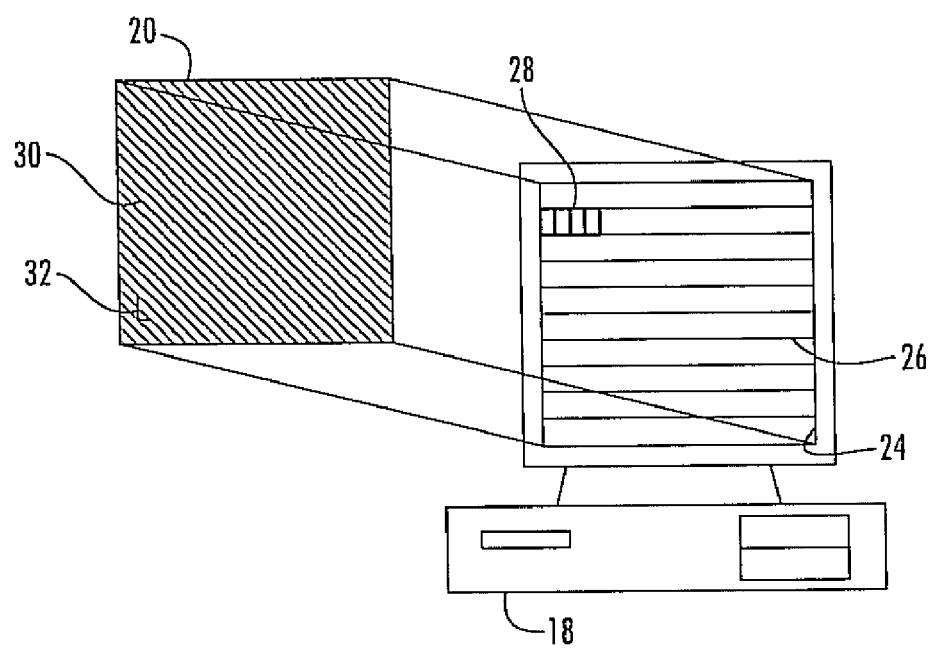
FIG. 2 is a diagrammatic view of a display device with a lenticular sheet removably attached thereto constructed in accordance with an exemplary embodiment of the present invention.

Referring now to FIG. 2, a display area 24, which is part of the digital display device 18 is shown in greater detail. The display area 24 consists of a plurality of scan lines 26. Each scan line 26 consists of a set of precisely positioned pixels 28 each of which is comprised of individually colored sub-pixels. The lenticular sheet 20 with an array of slanted lenticules 30 is precisely, removably attached over the display area 24.

On any given scan line 26, a single lenticule 30 will cover a non-integer number of sub pixels. The optical properties of the lenticule causes the emitted light from these covered sub pixels to be refracted at different angles towards a viewer. This phenomena is repeated for all lenticules over all scan lines 26. The design of the lenticular sheet 20 including the lenticular pitch (lenticules per inch) and slant angle 32 (rotation of the lenticule to the vertical or traditional panoramagram orientation) is optimized such that the calculated inter-digitation mapping of perspective views to sub pixels will allow a complete representation of each perspective view to be projected in space towards a viewer. The viewer will thus be able to observe different views in both eyes and perceive a perspective representation. By providing lenticular screen having angled lenticules, a display system having a matched resolution in both the horizontal and vertical configuration can be achieved. This produces a three dimensional image that has superior clarity and brightness when compared to a traditional striped lenticular screen. Also, by providing a lenticular lens at a slant angle, higher clarity image may be viewed as a reduction in moiré and/or rainbow effects is produced. By way of example, for a display device having a display area of 49½ inches by 37½ inches, it has been found that the preferred pitch angle for lenticules of a 16.7 lpi, ½ inch thick lenticular sheet is 19.5 degrees. Further, for such a sheet, the preferred viewing angle is ≈16 degrees.

In accordance with one exemplary embodiment of the present invention, the lenticular sheet 20 is fabricated by first designing a cutting tool, such as a stylus, with a desired lens shape. The cutting tool is preferably made of a diamond or carbide, however, it will be understood by those skilled in the art that any hard material suitable for engraving cylinders may be used. The shape of the cutting tool is dictated by the desired visual effect, however, in order to provide a higher clarity, a first radius is formed on either side of the distal end of the cutting tool and then a second, larger, radius is formed on the tip of the cutting tool.

Once the cutting tool is designed, the inverse lens shape is engraved into pre-selected portions of a flat plate or cylinder using any known, conventional method of engraving, thereby forming a plurality of inverse lens arrays or patterns. Preferably, the engraving processing includes the use of a computer operable for directing the cutting tool in both direction and depth such that an optimal lens pattern can be transferred into the plate or cylinder. Advantageously, by using the engraving process for the plate or cylinder, a variety of inverse lens patterns can be engraved into the plate or cylinder, thereby providing a variety of lens patterns embossed on the same sheet, including but without limitation, lens patterns having different shapes and lens patterns extending in different directions such as longitudinally and latitudinally from a certain axis.

Subsequent to engraving the plate or cylinder, the cylinder is placed into the lenticular system or process of manufacture. The inverse lens pattern is then transferred to a sheet material using known conventional extrusion embossment methods, thereby forming the lens pattern on the sheet in the desired areas only.

In exemplary embodiments, the produced lenticular sheet 20 has a thickness of about 0.005 inches to about 0.025 inches and is not usually at the focal point of the pattern. Subsequent to the embossing of the resulting lenticular sheet 20, the sheet 20 is cast or laminated onto a stable biaxial and heat stabilized film. In exemplary embodiments, the film is polyethylene terephthalate (PET). Thereafter, the lenticular sheet 20 is laminated to a polymeric material or a crystalline structure such as propylene carbonate, Acrylli, PETG or glass. The thickness of the polymeric material or crystalline structure is dictated by the thickness of the lens sheet 20 and the thickness of a viewing panel of the display device 18 to place the focal point at the pixel level on the display device. In exemplary embodiments, the focal point may be in the range of 0.5 to 0.005 inches. The sheet 20 is then formed into a shape such that the size of the sheet corresponds to the dimensions of the video display device 18 and so that lenticules 30 of the sheet are angled to correspond to the pixel size and pitch values of the video display device 18. In exemplary embodiments, the lenticular sheet 20 is shaped to the size of the display device 18 by any conventional means, including but not limited to rotor cutting, press cutting, stamping, or the like. The lenticular sheet 20 is then removably attached to the video display device 18 such that the resized, interlaced two dimensional image 14 may be transmitted to the video display device 18 from the data source 16 and projected on the display device 18 for viewing in three dimensions through the lenticular sheet 20. Attachment of the lenticular sheet 20 to the display device 18 may be by any conventional means, but is preferably performed by a frame incorporating corner type angles or the like. In other exemplary embodiments, the sheet 20 may be integrally formed or attached to the display device 18, for example where its intended use is for advertisement only. In yet another embodiment, the lenticular sheet 20 may be the screen of the display device 18.

Figure 3:
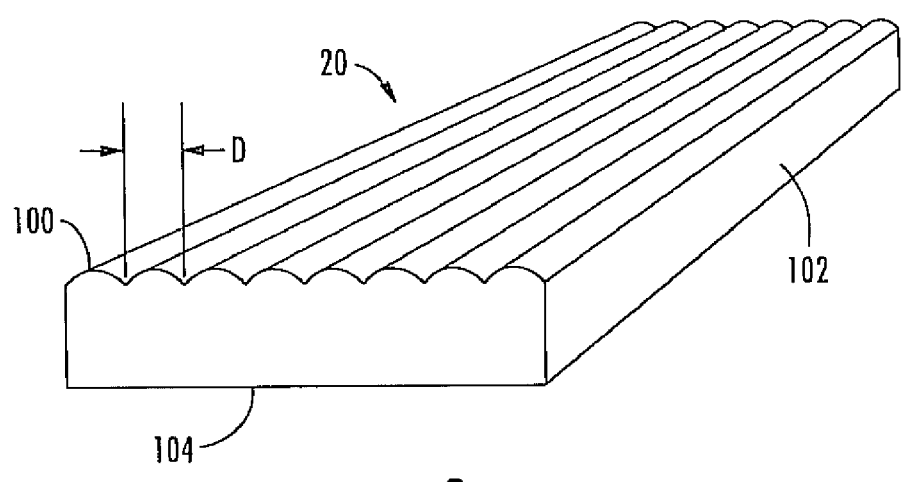
FIG. 3 is a perspective view of a portion of a lenticular sheet produced in accordance with the method of the present invention and operable for use with the system of the present invention.

Referring now to the drawings, FIG. 3 is a perspective view of a portion of a lenticular sheet 20. The sheet 20 is provided with lens elements 100 that are cylindrical lenses with a circular cross section. The width of each lens is D. The lenticular sheet consists of a dielectric medium 102 with multiple convex lenses 100 formed on a viewer side. The dielectric medium 102 may be any transparent material, but is typically a clear plastic having good mechanical properties. The planar side of the array 104 contains a printed image that is commonly designed using a computer to be addressed by the sheet 20 and variation in a viewer's angle of regard.

Figure 4:
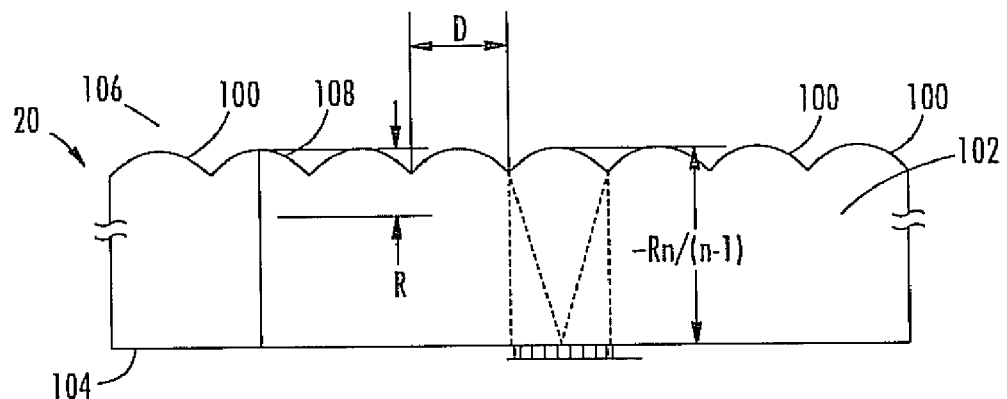
FIG. 4 is a cross-sectional view of the lenticular sheet shown in FIG. 3.
Figure 5:
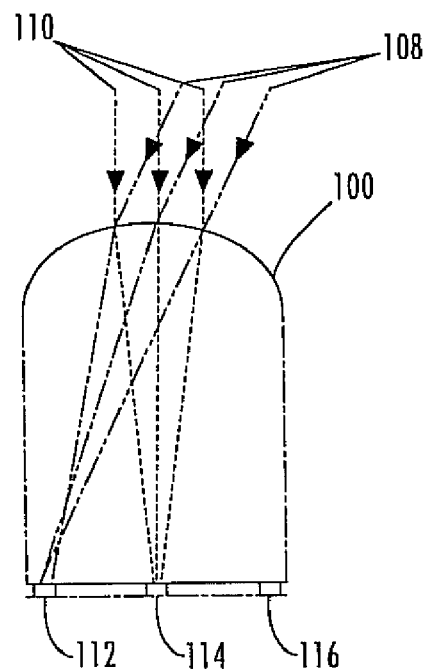
FIG. 5 is a cross-sectional view of a lens element of the lenticular sheet shown in FIG. 3.

FIG. 4 is a cross-sectional view of the lenticular sheet 20 shown in FIG. 3. The sheet 20 has dimensions MD×ND×~nR/(n−1) where D is the width of a lens element 100 as best shown in FIG. 5, n is the index of refraction of the plastic material, R is the radius of the lens element 100 and R<D/2. M and N are product variables. In one example, an image may be presented, wherein M and N may be on the order of 50 to 100 or more. The actual dimension D depends on the design viewing distance and quality objectives. In exemplary embodiments, the actual dimension D is calculated by the following subtracting the thickness of the surface of the display device from the focal point of the lenticular sheet 20. In exemplary embodiments, the thickness is on the order of 250 mils.

The transparent material is commonly formed as a sheet with a lens array formed on the entirety of a front side 106, or a viewer side. The backside 104, or flat side, is considered a non-viewer side. The radius of the substantially circular cross section, R, is shown larger than the lens spacing D. The overall thickness of the array is:

$$\text{Thickness} \sim R \times n/(n-1)$$

where n is an index of refraction for the dielectric medium. The backside 104 is removably attached to a display device such that the lenticular sheet is aligned with the viewing portion of the display device.

The viewing angle of the lenticular sheet 20 and utilized by the present invention is determined by the following formulation:

$$\text{Angle} = 2 \text{ arc Tan } W/(2J/n)$$

where W is the lens width, J is the focal point, calculated from the radius and n is the index of refraction. For 3D images the viewing angle is inversely proportional to the amount of virtual depth that can be created with a lenticular lens. A larger viewing angle will provide less virtual depth and a smaller viewing angle will provide more virtual depth. Virtual depth is defined as the perceived distance either into or out of the viewing plane. The angle is substantially equal to the distance you would have to move for one image to flip to another. The smaller the number, the quicker the flip and the more suitable for 3D which has a number of images of the same scene from a slightly different angle. In exemplary embodiments, the viewing angles of the present invention are in the range of about 15 to 26 degrees. However, it will be understood by those skilled in the art that the viewing angles may be from about 3 to 40 degrees.

FIG. 5 is a cross-sectional view of the lens element 100 of the lenticular sheet 20 shown in FIG. 3. Since the viewer's eye is on the order of 4,000 times the radius of the lens cross section, an individual lens can be analyzed with negligible error by assuming that light rays at a first angle 108 and light rays at a second angle 110 are parallel. The lens 100 focuses the rays from a repertoire of angles onto a repertoire of printed regions. The light rays from the first angle 108 focus on a printed region 112. From symmetry, light rays at an angle that is negative with respect to a perpendicular to the sheet 20, if the angle 108 is defined as positive, focus on an area 114 that is mirrored from the centerline of the lens 100. Light rays from the second angle 110 focuses on and therefore select a second, independent area 116. If the repertoire of images has a defined number, the lens 100 must be capable of adequately focusing on a same number of independent areas. The actual repertoire of angles need not be a linear progression. If one marks off the projection of the lens 100 on the surface 104 in q centers where q is the number of images in the repertoire and then calculates the corresponding angles of regard, parallel rays at these angles must focus in a reasonably non-overlapping fashion on the surface at the best image plane compromise available. Non-compensated lenses will typically depart from the ideal. A measure of the quality of a lens is the standard deviation of a point from a spread of points that intersect the lens. If the standard deviation is such that focus areas overrun adjacent focus areas, the images seen will not be well defined in color and especially definition.

The video display device 18 can be any known display device known in the art, used for displaying photographic or video images including, but not limited to, computer monitors, televisions, CRTs, LCDs, LCD projectors, plasma displays, flat panel displays, mobile phone displays, portable, handheld displays and other similar devices. Flat screen display devices are preferred for ease in applying the lenticular sheet 20. When coupled to an LCD display system, the lenticular sheet 20 focuses the LCD pixel array at the cylinder-shape lens array focal plane. The lenticular sheet 20 refracts the light from the LCD pixel array so viewers observing the LCD images through the lenticular sheet see different images based on their angular position to the LCD.

The exemplary embodiments of the present invention are operable for presenting a desired three dimensional visual effect that serves as a significant improvement over the above described prior art methods and systems. In addition, the exemplary embodiments of the present invention have multiple uses and benefits in various industries. For example, the produced images may be displayed in the form of a movie, television program, game, "screen saver", slide show, power point presentation, trade show and in store graphics or other such displays as medical diagnostics. A screen saver can be one or more chosen images which repeat continuously and are provided with the 3-D, morph or flip effects. A slide show can be from a collection of ones favorite 3-D images being played in succession. Added dramatic effects are achieved in a power point presentation. Trade show and in store graphics viewed on a monitor gather added attention while advertising a particular product.

It will be apparent to those skilled in the art that various modifications and variations can be made to the present invention without departing from the spirit and scope of the invention. Thus, it is intended that the present invention cover all conceivable modifications and variations of this invention, provided those alternative embodiments come within the scope of the appended claims and their equivalents.

What is claimed:

1. A lens structure for a display device comprising:
a transparent substrate material having a plurality of lenses located on one side thereof, the plurality of lenses being angled and corresponding to a pixel size and pitch of a video display device such that when the lens structure is attached to the video display device at least one two dimensional interlaced image may be viewed in three dimensions.

2. The lens structure according to claim 1, wherein said at least one image further comprises a series of three dimensional images forming a video.

3. The lens structure according to claim 1, wherein the lens structure has a thickness in the range of 0.005 to 0.025 inches.

4. The lens structure according to claim 1, wherein the plurality of lenses have a viewing angle in the range of 15 to 26 degrees.

5. The lens structure according to claim 1, wherein the plurality of lenses have a viewing angle in the range of 3 to 40 degrees.

6. The lens structure of claim 1, wherein the substrate material is laminated to a polymeric material.

7. The lens structure of claim 1, wherein the substrate material is laminated to a crystalline material.

8. The lens structure of claim 1, wherein the substrate material is shaped to correspond to a display area of the video display device.

9. The lens structure of claim 1, wherein the substrate material is operable for removable attachment to the video display device.

10. The lens structure of claim 1, wherein the video display device is selected from the group consisting of computer monitors, televisions, CRTs, LCDs, LCD projectors, plasma displays, flat panel displays, mobile phone displays, and portable, handheld displays.

11. A lens structure for a three dimensional display device comprising:
a transparent substrate material having a plurality of lens elements located on one side thereof, the plurality of lens elements being angled and corresponding to a pixel size and pitch of a video display device such that when the lens structure is attached to the video display device images projected by the video display device may be viewed through the lens structure in three dimensions.

12. The lens structure according to claim 11, wherein said images further comprise a series of three dimensional images forming a video.

13. The lens structure according to claim 11, wherein the lens structure has a thickness in the range of 0.005 to 0.025 inches.

14. The lens structure according to claim 11, wherein the plurality of lenses have a viewing angle in the range of 15 to 26 degrees.

15. The lens structure according to claim 11, wherein the plurality of lenses have a viewing angle in the range of 3 to 40 degrees.

16. The lens structure of claim 11, wherein the substrate material is laminated to a polymeric material.

17. The lens structure of claim 11, wherein the substrate material is laminated to a crystalline material.

18. The lens structure of claim 11, wherein the substrate material is shaped to correspond to a display area of the video display device and is operable for removable attachment to the video display device.

19. The lens structure of claim 11, wherein the video display device is selected from the group consisting of computer monitors, televisions, CRTs, LCDs, LCD projectors, plasma displays, flat panel displays, mobile phone displays, and portable, handheld displays.

20. An apparatus for displaying a three dimensional image comprising:
(a) a video display device having a pixel size value and a pitch value; and
(b) a lenticular sheet releasably attached to the video display device, the lenticular sheet comprising a plurality of lenticules that are angled to correspond to the pixel size value and the pitch value of the video display device, wherein at least one two dimensional interlaced image may be viewed in three dimensions.

* * * * *